May 12, 1970     E. HUGHES     3,511,408

TRUCK BED COVER APPARATUS

Filed Jan. 21, 1969     2 Sheets-Sheet 1

EDWARD HUGHES

*John H. Widdowson*

ATTORNEY

May 12, 1970  E. HUGHES  3,511,408
TRUCK BED COVER APPARATUS
Filed Jan. 21, 1969  2 Sheets-Sheet 2
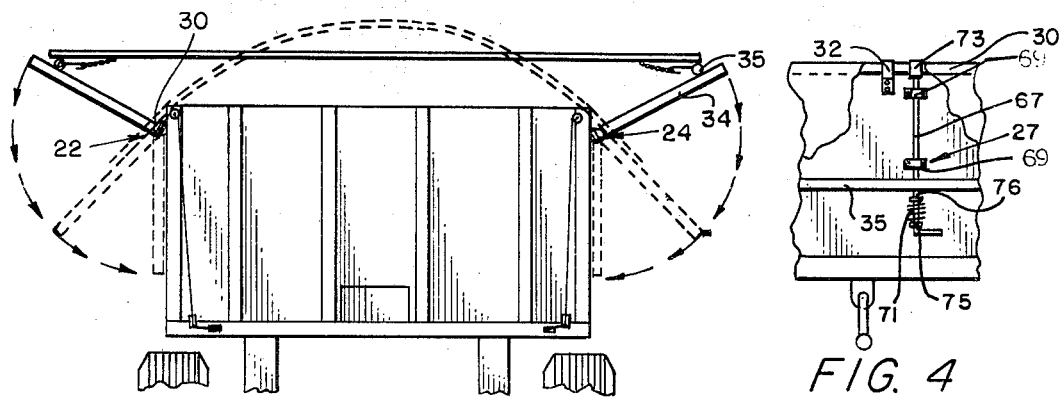
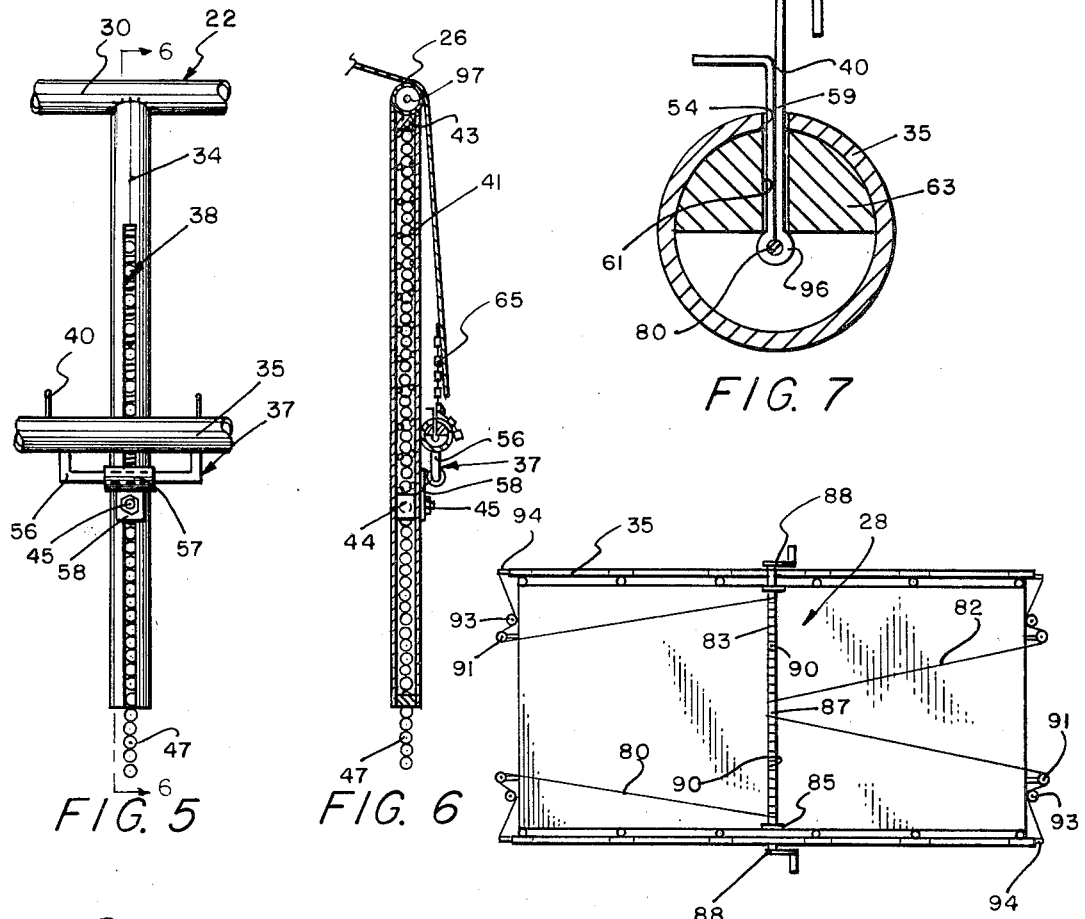
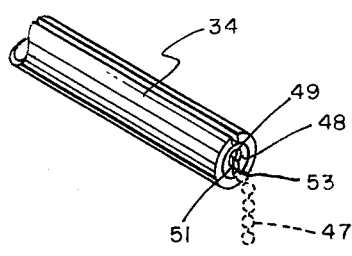
INVENTOR
EDWARD HUGHES
BY
John H. Widdowson
ATTORNEY

United States Patent Office 3,511,408
Patented May 12, 1970

3,511,408
TRUCK BED COVER APPARATUS
Edward Hughes, 207 N. Gow, Wichita, Kans. 67204
Filed Jan. 21, 1969, Ser. No. 792,527
Int. Cl. B65d 45/00; B60p 7/04
U.S. Cl. 220—55                                     8 Claims

ABSTRACT OF THE DISCLOSURE

This invention is a cover apparatus mountable over the open, upper end of truck beds having a cover member biased into the covered or closed condition to hold a load therein and includes a cover retraction means operable to retract the cover member when desired to expose the truck bed. More particularly, this invention is a truck bed cover apparatus having cover attachment means connected to opposite sides of a cover member movable from a relaxed condition to a spring biased condition to hold any material contained within the truck bed with the entire structure being readily adjustable.

---

Numerous types of tarpaulin or canvas covers are known to the prior art operable to be attached to and cover the upper open end of truck bodies. However, the prior art devices are either simple, hard to use cover members or are so complicated in structure requiring considerable expense, external power source, and substantial skill to operate same. In fact, none of the prior art devices are operable to easily and simply retract the cover member over a truck body and also to apply an adjustable lateral tension on the closed cover member so as to retain sand, grain or the like upwardly of the side walls within the truck to attain more efficient and effective usage thereof.

In one preferred embodiment of this invention, a truck bed cover apparatus is provided readily attachable to conventional truck structures and operable to be moved from a relaxed condition to a tension condition covering the upper, open end of a bed structure and, additionally, movable longitudinally thereof to a retracted condition. The cover appartus includes right and left side cover attachment means connected to a large cover member which, in turn, is connected to cover retraction means plus an anchor means is provided operable to hold the cover attachment means in the tension condition. The cover member is provided with a large rectangular, canvas body having a plurality of spaced chain members secured along its opposed parallel edges operable to be connected to the cover attachment means. Each of the cover attachment means includes an elongated support tube pivotally connected as by brakets to outer, upper edges of the respective side walls of the bed structure; a plurality of spaced, parallel reaction tubes secured to and extended laterally of the support tube as by welding; a biasing assembly mounted within respective ones of said reaction tubes and operably connected to a cover connector pipe member through respective support arms. Each biasing assembly includes a compression spring member mounted within a respective one of the reaction tubes having an upper end engagable with an anchor plug and the lower end engagable with a connector sleeve which is connected to the support arms. A spring adjustment chain member is trained through the connector sleeve having its upper end secured to the anchor plug. The chain member is movable downwardly within the reaction tube to compress the spring member whereupon the chain is movable laterally within a slot in the lower end of the reaction tube for adjusting the compression of the spring member. It is noted that the adjustment of the compression spring member operates to provide a downward force upon the cover connector pipe member. The opposite reaction to this downward force is provided by a plurality of attachment hook members mounted within and axially movable of the connector pipe member with the hook members connected to the chain members attached to the cover member. Each of the attachment hook members is connected to a half ball member within the pipe member for ease of axial movement. The anchor means includes an elongated, detent rod biased upwardly by a spring and secured by bracket members to the outer side of the bed structure. The upper end of the detent rods are movable into openings within collars attached to respective ones of the support tubes to hold the same in a downwardly or tension condition. The cover retraction means includes a winch and pulley assembly having a winch member mountable and extended under the truck bed structure; a plurality of pulley members connected to the connector pipe members and front and rear portions of the bed structure; and cable members are trained about the winch member and the pulley members with opposite ends secured to respective outermost ones of the attachment hook members. On rotation of the winch member, the cable member operates to move the cover member into the retracted or covered condition.

One object of this invention is to provide a truck bed cover apparatus overcoming the aforementioned disadvantages of the prior art structures.

One further object of this invention is to provide a truck bed cover appartus which is operable to be moved from a relaxed condition to a tension applying condition over a load within the bed structure and, additionally, operable to be movable in either direction to a retracted condition for loading the bed structure.

Still, one further object of this invention is to provide a truck bed cover appartus having a large cover member connected through right and left side attachment means to a truck bed structure and operable through a cover retraction means to move the cover member from closed to retracted condition for loading purposes.

One further object of this invention is to provide a truck bed cover apparatus movable under a spring loaded condition to the closure condition over a truck bed structure and operable so as to apply a tensioned cover to the material being conveyed.

Still, another object of this invention is to provide a truck bed cover apparatus which is easily movable from operative to inoperative conditions; economical to manufacture; operable to apply a force against a load being carried therein; and readily movable from the closure to the retracted condition for loading and unloading the truck bed structure.

Various other objects, advantages, and features of the invention will become apparent to those skilled in the art from the following discussion, taken in conjunction with the accompanying drawings, in which:

FIG. 3 is a fragmentary, rear elevational view of the truck structure having the cover apparatus mounted thereon illustrated in the tension condition in dotted lines;

FIG. 4 is a fragmentary elevation view taken along line 4—4 in FIG. 1;

FIG. 5 is an enlarged fragmentary elevational view of the cover attachment means of the cover apparatus of this invention;

FIG. 6 is a sectional view taken along line 6—6 in FIG. 5;

FIG. 7 is an enlarged sectional view taken along line 7—7 in FIG. 5;

FIG. 8 is a fragmentary perspective view of the reaction tube of this invention; and FIG. 9 is a schematic diagram illustrating the retraction means of the cover apparatus of this invention.

Figure 1:
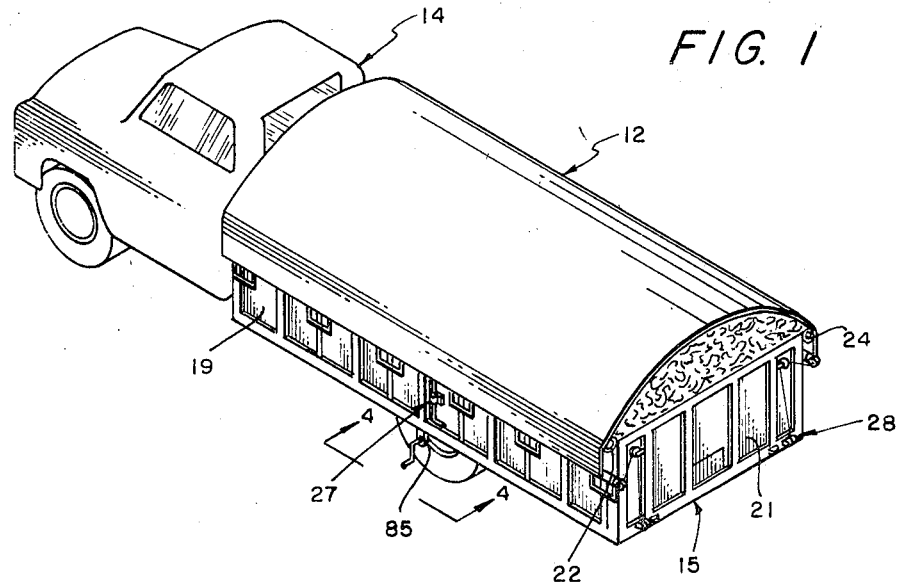
FIG. 1 is a perspective view of the truck bed cover apparatus of this invention illustrated as enclosing a load carried in a conventional truck structure.
Figure 2:
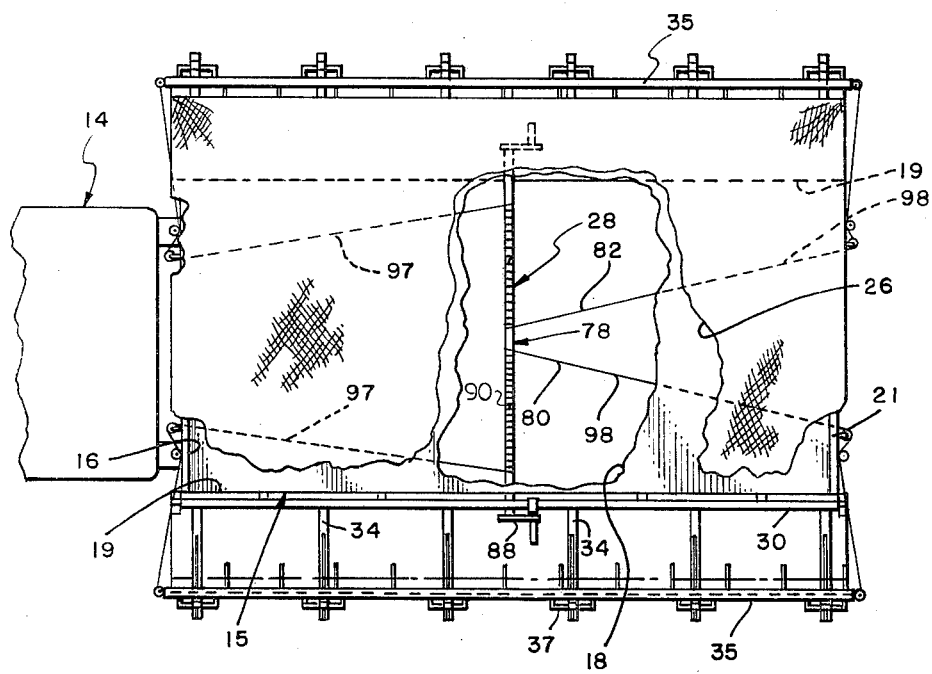
FIG. 2 is a fragmentary, top plan view of the truck structure and cover apparatus as shown in FIG. 1 with portions broken away for clarity.

The following is a discussion and description of preferred specific embodiments of the new truck bed cover apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular FIG. 1, a cover apparatus, indicated generally at 12, is illustrated as mounted upon a conventional truck structure 14. More particularly, the cover apparatus 12 is mounted upon a bed structure 15 having a front wall 16, a bottom wall 18, parallel side walls 19, and an end gate 21. The cover apparatus 12 is illustrated as covering a load of material such as grain or sand applying a compression force against the material being conveyed so as to retain the same therein.

The truck bed cover apparatus 12 includes right and left side cover attachment means 22 and 24 pivotally connected to respective ones of the side walls 19 of the truck structure 14; a cover member 26 operably connected to the attachment means 22 and 24; anchor means 27 connected to each of the side walls 19 of the truck bed 15 and operably engageable with the respective side cover attachment means 22 and 24 for anchoring as will be explained; and a cover retraction means 28 mounted upon the bed structure 15 operably connected to the cover member 26 for moving the same from the tension position of FIG. 1 to a retracted position for ease of loading and unloading material.

As the right and left side cover attachment means 22 and 24 are substantially identical, only one need be described in detail. The left side cover attachment means 22 includes a main elongated support tube 30 secured by a plurality of spaced bracket members 32 to the upper edge of the side wall 19; a plurality of parallel reaction tubes 34 secured as by welding to the support tube 30 extended substantially perpendicular thereto; an elongated cover connector pipe member 35 connected through support assemblies 37 and respective biasing assemblies 38 to the reaction tubes 34; and a plurality of attachment hook members 40 slidably mounted within the connector pipe member 35 and connected to the cover member 26. Each of the biasing assemblies 38 includes a main compression spring 41 having one end engageable with an anchor plug 43 and the opposite end secured through a connector sleeve member 44 and a bolt member 45 to the support assembly 37. The anchor plug 43 is secured as by welding to an elongated ball chain member 47 which extends through the axis of the compression spring member 41, the connector sleeve member 44, and an opening in the lower end of the reaction tube 34. The lower end of the reaction tube 34 is provided with a plug member 48 having a key slot 49 therein whereupon the chain member 47 is readily movable laterally of a main circular portion 51 into a slot 53 for anchoring purposes for reasons to become obvious.

As seen in FIG. 6, it is obvious that downward movement of the ball chain member 47 operates to move the anchor plug 43 to compress the spring member 41 and provide a downward force upon the connector sleeve 44. This biases the connector pipe member 35 through its support assembly 37 downwardly. It is also obvious that the amount of resultant compression force of the spring member 41 is regulated by the amount of downward pull of the ball chain member 47 which is locked within the slot 53.

The cover connector pipe member 35 has an upper portion provided wits an elongated continuous slot or cutout 54 therein for reasons to be explained. The support assembly 37 provided with a U-shaped support arm 56 having a mid-portion rotatably mounted within a sleeve member 57 secured through a lug member 58 and the bolt member 45 to the connector sleeve 44. Mounted within the connector pipe member 35 is a plurality of the attachment hook members 40 extended through the slot 54, each having a main body 59 extended through an opening 61 in half ball slide member 63. The ball slide members 63 are of a size to conform to the internal curvature of the connector pipe member 35 for ease of axial movement therewithin as will be explained.

The cover member 26 as illustrated is of a large rectangular shape adapted to completely cover the upper open end of the bed structure 15. It is obvious that the cover member 26 can be made of any suitable plastic or canvas material which provides sufficient strength for repeated usage, preferably of a water-proof material to protect the contents carried by the truck structure 14. The cover member 26 is provided along its opposite parallel side edges with a plurality of chain members 65 secured thereto as by grommets or the like. The chain members 65 are respectively connected to certain ones of the attachment hook members 40. In other words, as shown in FIG. 3, it is seen that the compression spring member 41 normally urges the connector pipe member 35 outwardly of the respective support tubes 34 and the reaction against such outward movement is the cover member 26 attached to the respective attachment hook members 40 as shown in FIG. 6.

As shown in FIG. 4, each anchor means 27 includes an elongated detent rod or actuator 67 secured by bracket members 69 to one to each side wall 19 of the truck structure 14; a compression spring 71 mounted about the lower end of the detent rod 67; and a sleeve member 73 secured as by welding to the respective ones of the support tubes 30 in cooperating alignment with the detent rod 67. More particularly, the compression spring 71 has one end contacting a stationary abutment member 75 secured to respective ones of the side walls 19 and the opposite end is engageable with a washer member 76 anchored to the detent rod 67. It is obvious that the compression spring 71 operates to continuously bias the detent rod 67 upwardly into engagement with respective ones of the sleeve members 73. Each sleeve member 73 is provided with a hole to receive the upper end of detent rod 67 so as to anchor respective ones of the right and left side cover attachment means 22 and 24 in the closure or downward position. It is seen that downward movement of the detent rod 67 against the force of the compression spring 71 operates to release the upper end from the hole in the sleeve member 73 and permit rotation of the cover attachment means 22 and 24 to the position shown in full lines in FIG. 3.

In the use and operation of the cover apparatus 12 as now described, it is seen that the cover attachment means 22 and 24 are readily connectable to the cover member 26 through the attachment hook members 40 mounted in respective ones of the connector pipe members 35. As the attachment hook members 40 are slidably mountable through the ball slide members 63 within the connector pipe members 35, the entire cover member 26 is readily movable to a retracted position such as near the cabin portion of the truck structure 14 for loading the bed structure 15 as desired. After loading same, it is obvious that the cover member 26 may be movable longitudinally of the connector pipe members 35 to the position shown in full lines in FIG. 3. Next, the tension force to be applied to the cover member 26 can be regulated by movement of the ball chain member 47 downwardly within the respective reaction tubes 34 which compresses the spring members 41 to present on outward force against the connector pipe members 35 through the support arms 56. It is obvious that such adjustment can be readily set on anchoring the respective ball chain member 47 within their key way slots 49. Next, the reaction tubes 34 can be grasped and pulled downwardly towards the covered position illustrated in FIG. 1. This operates to force the cover member 26 downwardly against the side walls 19 of the bed structure 15 or against a contoured load being carried. The force of the cover member 26 upon the load being carried is regulated by the amount of force applied by the respective compression spring members 41 within the reaction tubes 34. On achieving the desired compression force and the downward position, the anchor means 27 is automatically operable to lock itself upon the detent rod 67 moving within the hole within the respective connector sleeve members 73 to hold the same in its anchored condition. The cover apparatus 12 of this invention is readily operable to provide an adjustable and desired force of the cover member 26 on the load being carried so that the truck structure 14 can actually be used to carry a larger load than normally woudl be expected as the cover apparatus 12 prevents the same from being dislodged or blown away during transporting thereof.

A further improvement involves the use of the cover retraction means 28 which includes a winch and pulley assembly 78 connected through a pair of continuous or endless cable members 80 and 82 to the cover member 26 for movement of the same. The winch and pulley assembly 78 includes a primary winch member 83 secured as by brackets 85 to the undersurface of the bottom wall 18 of the bed structure 15 and a plurality of pulley members to receive the cable members 80 and 82 thereover.

The winch member 83 is provided with an elongated main shaft 87 having handle members 88 on opposite ends so that the shaft 87 may be easily rotated by persons on either side of the truck structure 14 and in either direction. It is obvious that a ratchet assembly or lock means (not shown) is attached to the winch member 83 to secure the same in a given rotational position. As the cable members 80 and 82 are operable on opposite sides of the bed structure 15 and connected to the opposite sides of the cover member 26, it is obvious that only one side thereof need be described in detail as each side operates similarly. More particularly, the cable member 80 is wound about the support shaft 87 and secured at a central point indicated at 90 so that on rotation of the winch member the cable member 80 is wound upon the same on one end and released from the same at the opposite end. Each outward end of the cable member 80 from the winch member 83 is trailed about a first pulley member 91 mounted adjacent the lower edge of the respective front wall 16 and gate member 21 and extends upwardly to a second pulley member 93. Thereupon, a third pulley member 94 is secured to respective opposite ends of the cover connector pipe member 35 so that the cable member 80 is trained axially within the connector pipe member 35. The outer ones of the respective attachment hook members 40 connected to the forward and rearwardmost portions of the cover member 26 have an eye section 96 crimped and securely anchored to the portion of the cable member 80. The cable member 80 is also trained through eye sections 96 of the other attachment hook members 40 but the same is axially movable therewithin. It is noted that the first and last ones of the attachment hook members 40 anchored to the cable member 80 are such that the distance between the same is sufficient to fully extend the cover member 26 over the bed structure 15 as shown in FIG. 1.

In the use and operation of the truck bed cover apparatus 12 with the cover retraction means 28, it is to be noted that rotation of the winch member 83 through the respective handle members 88 operates, for example, on clockwise rotation as viewed in FIG. 1, to wind up a first portion 97 of the cable members 80 and 82 upon the winch member 83 and to release a like amount of the cable members 80 and 82 in a second portion 98 therefrom. This operates to pull the rearwardmost ones of the attachment hook members 40 secured to the respective cable members 80 and 82 forwardly to move the cover member 26 towards the cab portion of the truck structure 14. It is obvious that rotation of the handle member 88 on the winch member 83 in the opposite direction would cause the cover member 26 to move oppositely, namely rearwardly upon the bed structure 15. Also it is noted that the cover retraction means 28 is operable to cover and reveal the structure as desired for loading and unloading purposes from either end.

It is seen that the truck bed cover apparatus of this invention presents a neat appearing structure which can be readily attached to any size and shape of truck bed structure for closing and revealing the open portion thereof. Additionally, it is obvious that the cover apparatus can be used to cover any type structure whether a semi-truck structure, pick-up truck, or any other such area needing a cover member thereover. The cover apparatus of this invention presents a structure which can be readily mounted on the existing truck structures in an easy compact manner and one that is operable to provide tension on a load being carried which is desirable to prevent the same from being blown away during travel and also allows an additional load to be safely carried. Additionally, the cover apparatus of this invention presents a compact structure which is economical to manufacture, simple to use, readily movable from usage to non-usage condition, substantially maintenance free, and readily usable through the use of cover retraction means.

While the invention has been described in conjunction with preferred specific embodiments thereof, it will be understood that this description is intended to illustrate and not to limit the scope of the invention.

I claim:

1. An apparatus adapted to cover a box-like structure having a bottom wall with integral upright opposed side walls and end walls, respectively, comprising:
    (a) attachment means connected to at least one of said side walls movable from opened to closed conditions to cover the open end of said box-like structure, and having readily adjustable biasing means,
    (b) said attachment means including a support tube member pivotally connected to said side wall and extended the length thereof, and a connector pipe member connected by said biasing means to said support tube member so as to be biased outwardly thereby, and
    (c) a cover member connected to said pipe member, and said biasing means operable on the closed condition to maintain an even downward pull on said cover member to maintain a load within said box-like structure.

2. An apparatus as described in claim 1, wherein:
    (a) said attachment means including a plurality of laterally extended reaction tubes secured to said support tube member with said biasing means connected to said reaction tubes,
    (b) said biasing means including a compresion spring member mounted within each of said reaction tubes connected to a support assembly to bias same outwardly of said support tube, and
    (c) said support assembly connected to said cover member to maintain an outward biasing force thereagainst.

3. An apparatus described in claim 2, wherein:
    (a) said support assembly having said connector pipe member pivotally connected to the lower end of said compression spring members, and
    (b) said biasing means including chain members operably connected to the upper end of said compression spring members and lockably engageable with the lower ends of said reaction tubes whereby said chain members are adjustably connected to said reaction tubes to vary the force of compression of said spring members against said support assembly and interconnected said cover member.

4. An apparatus as described in claim 1, wherein:
(a) said attachment means including a pair of said elongated support tubes each pivotally connected to a respective one of said side walls and extended the length thereof, and said support tubes each having a plurality of parallel, laterally extended reaction tubes secured thereto and said biasing means connected to said reaction tubes through support assemblies to said connector pipe members, and
(b) said support assemblies each including a plurality of ball slide members mounted within said connector pipe members movable longitudinally thereof, and having connected to said slide members extended outwardly therefrom, attachment hook members connected to said cover member, whereby said cover member is movable from the open to closed conditions through the use of said attachment hook members and said slide ball members being movable axially within said connector pipe members.

5. An apparatus described in claim 1, including:
(a) an anchor means secured to said one of said side side walls operably connectable to said attachment means, said anchor means including a detent rod biased to a locked condition to a sleeve member secured to said attachment means to hold the same in the closed condition, and said detent rod movable axially to release said attachment means for moving said cover member to the open condition.

6. An apparatus as described in claim 1, wherein:
(a) said attachment means including one of said support tube members secured to each opposed upright edge of said side walls, a plurality of spaced reaction tubes secured to said support tubes extended substantially perpendicular thereto, and support assemblies connected to said reaction tubes and, additionally, secured as by hook members to said cover members, and
(b) said biasing assembly including compression springs mounted within said reaction tubes having one end engageable with said support tube respectively, and the opposite end connected to said support assemblies biasing the same and interconnected said cover member outwardly, and a chain member operably connected to the upper end of said compression spring member and engagable with a key slot member mounted at the lower end of said reaction tube whereby the same is movable axially of said reaction tube to vary the force of compression of said compression spring member,
(c) said support assembly having said connector pipe member secured by support arms through sleeve members to a connector member secured to the lower end of said compression spring member movable axially within said reaction tube, said pipe member having an upper open elongated slot portion axially thereof,
(d) said hook members secured to ball slide members mounted within said pipe members for axial movement to move said cover member from the open to closed conditions, and
(e) anchor means secured to respective ones of said side walls engagable with openings in an anchor sleeve connected to said support tubes and having a detent member engageable therewith within said anchor sleeve to hold said attachment means in the downward or closed condition.

7. An apparatus as described in claim 1, wherein:
(a) said attachment means including one of said elongated support tubes pivotally connected to each upper edge of said side walls, reaction tubes secured to said support tubes extended parallel and perpendicular thereto, and support assemblies connected to said reaction tubes and said cover member,
(b) said biasing means including a spring member mounted within each of said reaction tubes engageable with said support assemblies to bias the same and attached said cover member outwardly,
(c) said support assemblies including said elongated pipe member having a plurality of attachment hooks secured to slide members movable longitudinally thereof, said attachment hooks secured at various positions along said cover member, and
(d) said attachment hooks having the outermost ones on respective ones of said side walls anchored to said cable members which extends longitudinally of said pipe members whereby movement of said cable member in either direction within said connector pipe members operates to move said cover member longitudinally of said side walls from open to closed conditions and in either direction.

8. An apparatus as described in claim 7, wherein:
(a) said biasing means including chain members each having one end secured to the upper end of respective ones of said spring members and the opposite end engageable with a key way lock member secured to the outer end of respective ones of said reaction tubes to bias said support assemblies downwardly whereby said chain members are moved in an outwardly direction to increase the force of said spring members on said support assemblies, said pipe members, and said cover member to vary the biasing force thereagainst.

References Cited

UNITED STATES PATENTS 2,465,621  3/1949  Wheeler _____ 296—100
3,041,104  6/1962  Richard _____ 296—100

FOREIGN PATENTS 809,136  5/1951  Germany.

BENJAMIN HERSH, Primary Examiner
R. R. SONG, Assistant Examiner

U.S. Cl. X.R.
296—98, 100